US012701359B2

(12) United States Patent
Shu et al.

(10) Patent No.: US 12,701,359 B2
(45) Date of Patent: Aug. 4, 2026

(54) AUDIO DENOISING METHOD AND DEVICE, APPARATUS AND STORAGE MEDIUM

(71) Applicant: Beijing Zitiao Network Technology Co., Ltd., Beijing (CN)

(72) Inventors: Xiaofeng Shu, Beijing (CN); Yehang Zhu, Beijing (CN); Chuxiang Shang, Beijing (CN); Yanjie Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 271 days.

(21) Appl. No.: 18/571,119

(22) PCT Filed: Sep. 9, 2022

(86) PCT No.: PCT/CN2022/118040
§ 371 (c)(1),
(2) Date: Dec. 15, 2023

(87) PCT Pub. No.: WO2023/045779
PCT Pub. Date: Mar. 30, 2023

(65) Prior Publication Data
US 2024/0284100 A1 Aug. 22, 2024

(30) Foreign Application Priority Data
Sep. 24, 2021 (CN) .......................... 202111124158.6

(51) Int. Cl.
*H04R 3/04* (2006.01)
*G06N 3/08* (2023.01)

(52) U.S. Cl.
CPC ................. *H04R 3/04* (2013.01); *G06N 3/08* (2013.01); *H04R 2430/01* (2013.01)

(58) Field of Classification Search
CPC ... H04R 3/04; H04R 2430/01; G10L 21/0208; G10L 21/0216; G10L 21/0224; G10L 21/0232; G10L 21/0316
See application file for complete search history.

(56) References Cited

U.S. PATENT DOCUMENTS

2019/0066713 A1    2/2019   Mesgarani et al.
2021/0012767 A1    1/2021   Kupryjanow et al.
2024/0163627 A1*   5/2024   Chen ....................... H04S 1/007

FOREIGN PATENT DOCUMENTS

CN    108615535 A    10/2018
CN    108735213 A    11/2018
(Continued)

OTHER PUBLICATIONS

Deylami, Mohammad Saeed, and Sanaz Seyedin. "Fusion of Amplitude and Complex Domains based on Deep Neural Networks for Speech Enhancement." 2020 28th Iranian Conference on Electrical Engineering (ICEE), Aug. 6, 2020. (Year: 2020).*
(Continued)

*Primary Examiner* — James K Mooney
(74) *Attorney, Agent, or Firm* — Astute IP Law Group

(57) ABSTRACT

An audio denoising method and device, an apparatus, a computer-readable storage medium, and a program product. The method includes: obtaining audio data to be denoised; estimating amplitude time-frequency mask of the audio data to be denoised by using a preset real-valued network model to obtain a first-order enhanced amplitude spectrum corresponding to the audio data to be denoised; estimating complex time-frequency masking of the audio data to be denoised by using a preset complex-valued network model; and determining denoising resulted audio data corresponding to the audio data to be denoised by combining the first-order enhanced amplitude spectrum with the complex time-frequency mask.

18 Claims, 3 Drawing Sheets

(56) References Cited

FOREIGN PATENT DOCUMENTS

| CN | 109448751 A | 3/2019 |
|----|-------------|--------|
| CN | 110739002 A | 1/2020 |
| CN | 110808063 A | 2/2020 |
| CN | 111508514 A | 8/2020 |
| CN | 111883091 A | 11/2020 |
| CN | 112567458 A | 3/2021 |
| CN | 113241088 A | 8/2021 |
| CN | 113314147 A | 8/2021 |
| CN | 115862649 B | 3/2023 |
| KR | 10-2021-0105688 A | 8/2021 |

OTHER PUBLICATIONS

Zhao, Yan et al. "DNN-based enhancement of noisy and reverberant speech." 2016 IEEE International Conference on Acoustics, Speech and Signal Processing (ICASSP), Mar. 25, 2016. (Year: 2016).*

Hu et al., "DCCRN Deep complex convolution recurrent network for phase-aware speech enhancement", arXiv:2008.00264v4, Dec. 31, 2020, 5 pages.

Jei, Wu, "A Single Channel Speech Enhancement Algorithm Based on Temporal Convolutional Network", Full-text Database of Excellent Master's Degree Theses in Information Technology in China, 2022, 71 pages, with English Abstract.

Notice of Allowance for Chinese Patent Application No. 202111124158. 6, mailed on May 28, 2025, 7 pages.

Shu et al., "Joint Echo Cancellation and Noise Suppression based on Cascaded Magnitude and Complex Mask Estimation", Speech, Audio and Music Intelligence (SAMI) group, ByteDance, arXiv:2107. 09298v1, Jul. 20, 2021, 5 pages.

Tan et al., "Complex spectral mapping with a convolutional recurrent network for monaural speech enhancement", ICASSP, Dec. 31, 2019, 5 pages.

Zhang et al., "DeepMMSE: A Deep Learning Approach to MMSE-Based Noise Power Spectral Density Estimation", IEEE/ACM Transactions on Audio, Speech, and Language Processing, Dec. 31, 2020, 13 pages.

Zheng, "Signal Enhancement Based on Complex-valued Neural Networks", Information Science and Technology, Chinese Master's Theses Fall-Text Database No. 05, May 15, 2019, 85 pages, with English Abstract.

Li, "Single Channel Speech Enhancement Based on Deep Neural Network", Information Science and Technology, Chinese Master's Theses Fall-Text Database, No. 02, Feb. 15, 2021, 71 pages, with English Abstract.

Li et al., "Speech Enhancement Based on Joint Maximum A Posteriori Probability", Computer Systems & Applications, vol. 27, No. 12, Dec. 15, 2018, 6 pages, with English Abstract.

International Search Report in PCT/CN2022/118040, mailed Dec. 14, 2022, 5 pages.

\* cited by examiner

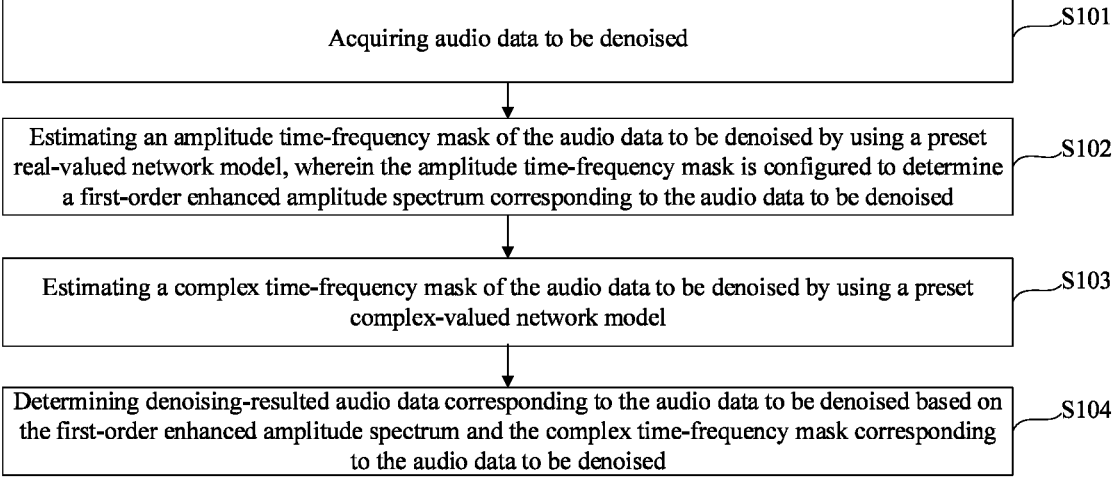

Acquiring audio data to be denoised — S101

Estimating an amplitude time-frequency mask of the audio data to be denoised by using a preset real-valued network model, wherein the amplitude time-frequency mask is configured to determine a first-order enhanced amplitude spectrum corresponding to the audio data to be denoised — S102

Estimating a complex time-frequency mask of the audio data to be denoised by using a preset complex-valued network model — S103

Determining denoising-resulted audio data corresponding to the audio data to be denoised based on the first-order enhanced amplitude spectrum and the complex time-frequency mask corresponding to the audio data to be denoised — S104

FIG. 1

AUDIO DENOISING METHOD AND DEVICE, APPARATUS AND STORAGE MEDIUM

CROSS REFERENCE TO RELATED APPLICATIONS

This is a national stage application based on International Patent Application No. PCT/CN2022/118040, filed Sep. 9, 2022, which claims priority to Chinese patent application No. 202111124158.6 filed on Sep. 24, 2021, entitled "AUDIO DENOISING METHOD AND DEVICE, APPARATUS AND STORAGE MEDIUM", the disclosures of which are incorporated herein by reference in their entireties.

TECHNICAL FIELD

The present disclosure relates to the field of data processing, and in particular to an audio denoising method and device, an apparatus and a storage medium.

BACKGROUND

During an audio recording process, noise often occurs in the recorded audio due to factors such as the environment or equipment, which results in a poor audio experience for the user.

At present, there are very few tools for a noise reduction of audio, and noise reduction effects that can be achieved by the only few ones are not satisfactory, either.

Therefore, how to achieve an audio noise reduction and hence to improve the sound quality of audio is the technical problem that needs to be solved urgently at present.

SUMMARY

In order to solve the technical problem above or at least partly solve the technical problem above, an embodiment of the present disclosure provides an audio denoising method, which can achieve an audio noise reduction, thereby better improving the sound quality of audio.

In a first aspect, the present disclosure provides an audio denoising method, including:

acquiring audio data to be denoised;

estimating an amplitude time-frequency mask of the audio data to be denoised by using a preset real-valued network model, wherein the amplitude time-frequency mask is configured to determine a first-order enhanced amplitude spectrum corresponding to the audio data to be denoised;

estimating a complex time-frequency mask of the audio data to be denoised by using a preset complex-valued network model; and determining denoising-resulted audio data corresponding to the audio data to be denoised based on the first-order enhanced amplitude spectrum and the complex time-frequency mask corresponding to the audio data to be denoised.

In an implementation, the estimating the complex time-frequency mask of the audio data to be denoised by using the preset complex-valued network model includes:

determining a complex frequency spectrum to be denoised; wherein the complex frequency spectrum to be denoised includes a complex frequency spectrum determined based on the first-order enhanced amplitude spectrum corresponding to the audio data to be denoised and an original phase spectrum of the audio data to be denoised, or, a complex frequency spectrum determined based on an original frequency spectrum and the original phase spectrum of the audio data to be denoised; and inputting the complex frequency spectrum to be denoised into the preset complex-valued network model, and outputting the complex time-frequency mask corresponding to the audio data to be denoised after a process of the preset complex-valued network model.

In an implementation, the determining the denoising-resulted audio data corresponding to the audio data to be denoised based on the first-order enhanced amplitude spectrum and the complex time-frequency mask corresponding to the audio data to be denoised includes:

determining an amplitude gain and a phase gain based on the complex time-frequency mask;

determining an enhanced phase spectrum corresponding to the audio data to be denoised based on the phase gain and an original phase spectrum corresponding to the audio data to be denoised;

determining a second-order enhanced amplitude spectrum corresponding to the audio data to be denoised based on the amplitude gain and the first-order enhanced amplitude spectrum corresponding to the audio data to be denoised; and determining the denoising-resulted audio data corresponding to the audio data to be denoised based on the second-order enhanced amplitude spectrum and the enhanced phase spectrum.

In an implementation, the preset real-valued network model and the preset complex-valued network model are configured to form a two-stage time-domain convolutional network (TCN) model.

In an implementation, before the estimating the amplitude time-frequency mask of the audio data to be denoised by using the preset real-valued network model, further including:

training the two-stage TCN model by using an audio training sample having a sampling rate higher than a preset sampling rate threshold.

In an implementation, before the training the two-stage TCN model by using the audio training sample having a sampling rate higher than the preset sampling rate threshold, further including:

performing a preset data augmentation processing on the audio training sample to obtain an augmented audio training sample;

correspondingly, the training the two-stage TCN model by using the audio training sample having a sampling rate higher than the preset sampling rate threshold includes:

training the two-stage TCN model by using the augmented audio training sample, wherein a sampling rate of the augmented audio training sample is higher than the preset sampling rate threshold.

In a second aspect, the present disclosure provides an audio denoising device, including:

an acquisition module, configured to acquire audio data to be denoised;

a first estimation module, configured to estimate an amplitude time-frequency mask of the audio data to be denoised by using a preset real-valued network model; wherein the amplitude time-frequency mask is configured to determine a first-order enhanced amplitude spectrum corresponding to the audio data to be denoised;

a second estimation module, configured to estimate a complex time-frequency mask of the audio data to be denoised by using a preset complex-valued network model; and a first determination module, configured to determine denoising-resulted audio data corresponding to the audio data to be denoised based on the first-order enhanced amplitude spectrum and the complex time-frequency mask corresponding to the audio data to be denoised.

In a third aspect, the present disclosure provides a computer-readable storage medium having an instruction stored therein, wherein the instruction is configured to cause a terminal device to realize the audio denoising method described above upon being executed on the terminal device.

In a fourth aspect, the present disclosure provides an apparatus, including: a memory, a processor, and a computer program stored on the memory and executable on the processor, wherein the processor is configured to realize the audio denoising method described above upon executing the computer program.

In a fifth aspect, the present disclosure provides a computer program product, including a computer program or an instruction, wherein the computer program or the instruction is configured to realize the audio denoising method described above upon being executed by a processor.

Compared with related technologies, the technical solutions provided by the embodiments of the present disclosure have at least the following advantages.

The embodiment of the present disclosure provides an audio denoising method. Firstly, audio data to be denoised is acquired, then an amplitude time-frequency mask of the audio data to be denoised is estimated by using a preset real-valued network model, and a first-order enhanced amplitude spectrum corresponding to the audio data to be denoised can be obtained. Furthermore, a complex time-frequency mask of the audio data to be denoised is estimated by using a preset complex-valued network model, and denoising-resulted audio data corresponding to the audio data to be denoised is determined by combining the first-order enhanced amplitude spectrum with the complex time-frequency mask. The embodiment of the present disclosure utilizes the preset real-valued network model to enhance the amplitude spectrum of the audio data to be denoised, and utilizes the preset complex-valued network model to enhance both amplitude spectrum and phase spectrum of the audio data to be denoised at the same time. As it can be seen, the embodiments of the present disclosure can realize noise reduction of the audio data to be denoised, and hence to improve the sound quality of audio in a better way.

BRIEF DESCRIPTION OF DRAWINGS

The accompanying drawings that are incorporated in and constitute a part of this specification illustrate embodiments consistent with the present disclosure and serve to explain the principles of the present disclosure with the description.

In order to more clearly illustrate the technical solutions of the embodiments of the present disclosure or related technologies, drawings that are necessary for the description of the embodiments or related technologies will be introduced briefly in the following. Apparently, for one of ordinary skilled in the art, other drawings can also be obtained from these drawings without any creative effort.

FIG. 1 is a flowchart of an audio denoising method provided by an embodiment of the present disclosure;

DETAILED DESCRIPTION

Figure 2:
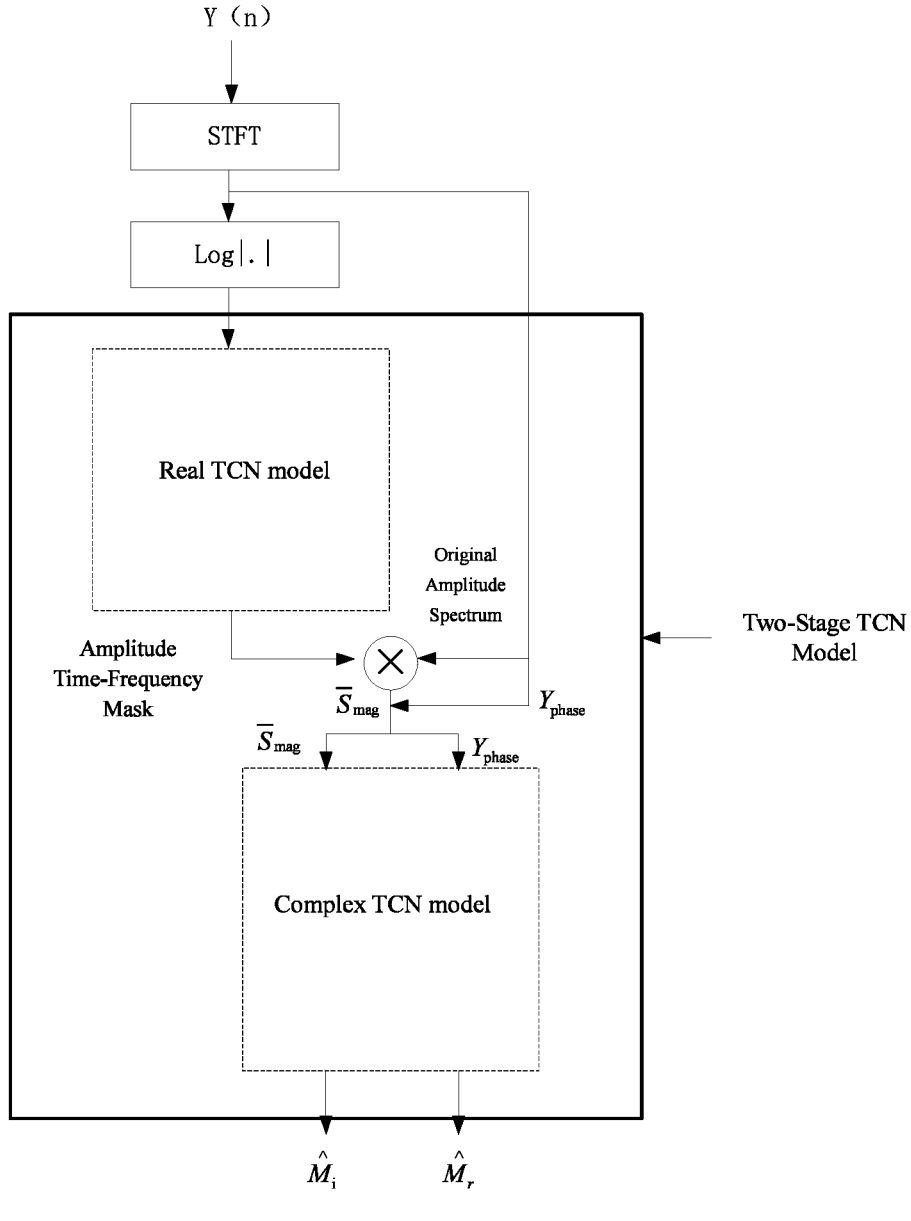
FIG. 2 is a schematic diagram of a two-stage TCN model provided by an embodiment of the present disclosure.

In order to more clearly understand the above objectives, features and advantages of the present disclosure, the solutions of the present disclosure will be further described below. It should be noted that, in the case of no conflict, the embodiments of the present disclosure and the features in the embodiments can be combined with each other.

In the following description, many specific details are set forth to fully understand the present disclosure, but the present disclosure can also be implemented in other ways than those described here; apparently, the embodiments in the description are only some but not all the embodiments of the present disclosure.

Due to reasons such as the recording environment or equipment, there may be noise in the recorded audio, which results in poor audio quality and affects user's experience. The noise in audio can be classified into at least two types, namely the stationary noise and the non-stationary noise. The stationary noise refers to the noise having statistical characteristics not changing with time, of which the common examples include white noise, pink noise, or the like. The non-stationary noise refers to the noise having statistical characteristics changing with time, of which the common examples include keyboard sound, mouse-click sound, or the like.

At present, tools for noise reduction of audio can be implemented by using artificial intelligence (AI) noise reduction models. However, although the existing AI noise reduction models usually have a good suppression effect on the stationary noise, their suppression effect on the non-stationary noise is poor. As a result, the noise reduction effect on audio achieved by the existing noise reduction tools cannot guarantee the user's experience.

In practical applications, audio noise reduction tools often use a single network model to achieve a noise reduction of audio. Although the complexity of the network model is lowered, it is difficult to guarantee the noise reduction effect on audio, for example, it is especially difficult to guarantee the suppression effect on non-stationary noise in audio. To this end, an embodiment of the present disclosure provides an audio denoising method, which uses a preset real-valued network model and a preset complex-valued network model to perform a noise reduction processing on the audio data to be denoised, respectively, and then determines denoising-resulted audio data corresponding to the audio data to be denoised by combining denoising results of the two models. As it can be seen, compared with the case using a single network model for noise reduction of audio, the embodiment of the present disclosure enables a better suppression effect on non-stationary noise, thereby ensuring the noise reduction effect on the overall audio and improving the sound quality of audio in a better way.

Specifically, according to the embodiment of the present disclosure, audio data to be denoised is acquired, then an amplitude time-frequency mask of the audio data to be denoised is estimated by using a preset real-valued network model, and a first-order enhanced amplitude spectrum corresponding to the audio data to be denoised can be obtained. Furthermore, a complex time-frequency mask of the audio data to be denoised is estimated by using a preset complex-valued network model, and denoising-resulted audio data corresponding to the audio data to be denoised is determined by combining the first-order enhanced amplitude spectrum with the complex time-frequency mask.

The embodiments of the present disclosure utilize the preset real-valued network model to enhance the amplitude spectrum of the audio data to be denoised, and utilize the preset complex-valued network model to enhance both amplitude spectrum and phase spectrum of the audio data to be denoised at the same time. As it can be seen, the embodiments of the present disclosure can realize the noise reduction processing of the audio data to be denoised while ensuring the noise reduction effect, thereby improving the sound quality of audio in a better way.

On this basis, an embodiment of the present disclosure provides an audio denoising method. Referring to FIG. 1, it is a flowchart of an audio denoising method provided by an embodiment of the present disclosure. The method includes following steps.

S101: Acquiring audio data to be denoised.

The audio data to be denoised in the embodiments of the present disclosure may be any audio segment, where the audio segment may also be an audio segment extracted from a video, or the like. Embodiments of the present disclosure do not limit the audio data to be denoised.

In practical applications, the embodiment of the present disclosure may perform real-time noise reduction processing on the audio data to be denoised during the audio recording stage, or may perform noise reduction processing on the audio data to be denoised during the audio editing stage. Embodiments of the present disclosure do not limit the noise reduction scenarios.

S102: Estimating an amplitude time-frequency mask of the audio data to be denoised by using a preset real-valued network model.

In this step, the amplitude time-frequency mask is configured to determine a first-order enhanced amplitude spectrum corresponding to the audio data to be denoised.

In the embodiment of the present disclosure, firstly, the preset real-valued network model is trained by using audio training samples to obtain a trained, preset real-valued network model, which is configured to perform an amplitude enhancement processing on the audio data to be denoised. The preset real-valued network model can be realized based on any AI model. For example, the preset real-valued network model can be realized by a temporal convolutional network (TCN), or by a recurrent neural network (RNN), etc.

In the embodiment of the present disclosure, after the preset real-valued network model is trained, the audio data to be denoised can be input into the preset real-valued network model for processing, and the preset real-valued network model outputs the amplitude time-frequency mask of the audio data to be denoised, in which the amplitude time-frequency mask is configured to represent a proportional relationship between an enhanced amplitude spectrum and an original amplitude spectrum.

In an implementation, the amplitude time-frequency mask is configured to determine the first-order enhanced amplitude spectrum corresponding to the audio data to be denoised. For example, the amplitude time-frequency mask is multiplied with the original amplitude spectrum of the audio data to be denoised, to obtain the first-order enhanced amplitude spectrum corresponding to the audio data to be denoised.

After the amplitude of the frequency spectrum of the audio data to be denoised is enhanced by using the preset real-valued network model, the amplitude time-frequency mask of the audio data to be denoised is obtained. Then, by multiplying the amplitude time-frequency mask with the original amplitude spectrum of the audio data to be denoised, an enhanced amplitude spectrum of the audio data to be denoised is obtained and is used as the first-order enhanced amplitude spectrum. The first-order enhanced amplitude spectrum is an amplitude spectrum obtained after the frequency spectrum of the audio data to be denoised is enhanced through the preset real-valued network model.

S103: Estimating a complex time-frequency mask of the audio data to be denoised by using a preset complex-valued network model.

In the embodiment of the present disclosure, firstly, the preset complex-valued network model is trained by using audio training data to obtain a trained, preset complex-valued network model, which is configured to enhance both amplitude and phase of the audio data to be denoised at the same time. The preset complex-valued network model can be realized based on any AI model. For example, the preset complex-valued network model can be realized by a temporal convolutional network (TCN), or by a recurrent neural network (RNN), etc.

In an implementation, before performing a noise reduction processing on the audio data to be denoised by using the trained, preset complex-valued network model, a complex frequency spectrum that is obtained based on an original frequency spectrum and an original phase spectrum of the audio data to be denoised is determined as a complex frequency spectrum to be denoised firstly. Then, the complex frequency spectrum to be denoised is input into the preset complex-valued network model for processing, and the preset complex-valued network model outputs the complex time-frequency mask corresponding to the audio data to be denoised. The complex time-frequency mask is configured to represent a proportional relationship between an enhanced frequency spectrum and the original frequency spectrum, and the complex time-frequency mask includes a real part and an imaginary part.

In order to improve the effect of noise reduction, the embodiments of the present disclosure can also determine a complex frequency spectrum that is obtained based on the first-order enhanced amplitude spectrum and the original phase spectrum corresponding to the audio data to be denoised as the complex frequency spectrum to be denoised, so that the amplitude and phase of the frequency spectrum of the audio data to be denoised can be further enhanced by the preset complex-valued network model on the basis of the noise reduction processing through the preset real-valued network model, thereby further improving the effect of noise reduction.

Specifically, in an implementation, the original phase spectrum of the audio data to be denoised is acquired firstly, and then a frequency spectrum that is obtained based on the first-order enhanced amplitude spectrum and the original phase spectrum corresponding to the audio data to be denoised is determined as the complex frequency spectrum to be denoised. Furthermore, the complex frequency spectrum to be denoised is input into the preset complex-valued network model for processing, and the preset complex-valued network model outputs the complex time-frequency mask corresponding to the audio data to be denoised.

S104: Determining denoising-resulted audio data corresponding to the audio data to be denoised based on the first-order enhanced amplitude spectrum and the complex time-frequency mask corresponding to the audio data to be denoised.

In the embodiment of the present disclosure, after the amplitude of the audio data to be denoised is enhanced by the preset real-valued network model, and both amplitude and phase of the audio data to be denoised are enhanced by the preset complex-valued network model, the first-order enhanced amplitude spectrum and the complex time-frequency mask corresponding to the audio data to be denoised are obtained, respectively. Then, based on the first-order enhanced amplitude spectrum and the complex time-frequency mask corresponding to the audio data to be denoised, the denoising-resulted audio data corresponding to the audio data to be denoised is determined, and the noise reduction processing of the audio to be denoised is realized.

In an implementation, firstly, an amplitude gain and a phase gain are determined based on the complex time-frequency mask. The amplitude gain is configured to characterize the amplitude enhancement of the frequency spectrum of the audio data to be denoised, which is performed by the preset complex-valued network model; and the phase gain is configured to characterize the phase enhancement of the frequency spectrum of the audio data to be denoised, which is performed by the preset complex-valued network model. Then, based on the phase gain and the original phase spectrum corresponding to the audio data to be denoised, a phase enhanced spectrum corresponding to the audio data to be denoised is determined. Furthermore, based on the amplitude gain and the first-order enhanced amplitude spectrum corresponding to the audio data to be denoised, a second-order enhanced amplitude spectrum corresponding to the audio data to be denoised is determined. The second-order enhanced amplitude spectrum is an amplitude spectrum obtained after amplitude enhancement on the audio data to be denoised, which is performed by the preset real-valued network model and the preset complex-valued network model. And then, based on the second-order enhanced amplitude spectrum and the enhanced phase spectrum, an enhanced frequency spectrum corresponding to the audio data to be denoised is determined, and the denoising-resulted audio data corresponding to the audio data to be denoised is determined based on the enhanced frequency spectrum.

In practical applications, formulas (1) and (2) can be used to calculate the amplitude gain and the phase gain, respectively. The following are formulas (1) and (2):

$$\hat{M}_{mag} = \sqrt{\hat{M}_r^2 + \hat{M}_i^2}; \tag{1}$$

$$\hat{M}_{phase} = \arctan 2(\hat{M}_i, \hat{M}_r); \tag{2}$$

where $\hat{M}_{mag}$ is used to represent the amplitude gain, $\hat{M}_r$ is used to represent a real part of the complex time-frequency mask, $\hat{M}_i$ is used to represent an imaginary part of the complex time-frequency mask, and $\hat{M}_{phase}$ is used to represent the phase gain.

In addition, a formula (3) can be used to calculate the enhanced frequency spectrum corresponding to the audio data to be denoised, the following is the formula (3):

$$\hat{S} = \overline{S}_{mag} \cdot \text{Tanh } (\hat{M}_{mag}) \cdot e^{\left(Y_{phase} + \hat{M}_{phase}\right)}; \tag{3}$$

where $\hat{S}$ is used to represent the enhanced frequency spectrum, $\hat{Y}_{phase}$ is used to represent the original phase spectrum, $e^{\left(Y_{phase} + M_{phase}\right)}$ is used to represent the enhanced phase spectrum, $\overline{S}_{mag}$ is used to represent the first-order enhanced amplitude spectrum, and $\overline{S}_{mag} \cdot \text{Tan h } (\hat{M}_{mag})$ is used to represent the second-order enhanced amplitude spectrum.

After the enhanced frequency spectrum corresponding to the audio data to be denoised is obtained, the denoising-resulted audio data corresponding to the audio data to be denoised is obtained by a processing such as inverse Fourier transform.

As it can be seen, in the audio denoising method provided by the embodiments of the present disclosure, firstly, the audio data to be denoised is acquired, and then the amplitude time-frequency mask of the audio data to be denoised is estimated by using the preset real-valued network model, and the first-order enhanced amplitude spectrum corresponding to the audio data to be denoised can be obtained. Furthermore, the complex time-frequency mask of the audio data to be denoised is estimated by using the preset complex-valued network model, and the denoising-resulted audio data corresponding to the audio data to be denoised is determined by combining the first-order enhanced amplitude spectrum with the complex time-frequency mask. The embodiments of the present disclosure utilize the preset real-valued network model to enhance the amplitude spectrum of the audio data to be denoised, and utilize the preset complex-valued network model to enhance both amplitude spectrum and phase spectrum of the audio data to be denoised at the same time. As it can be seen, the embodiments of the present disclosure can realize the noise reduction processing of the audio data to be denoised, thereby improving the sound quality of audio in a better way.

Because the TCN model has a better effect in the field of audio noise reduction than other network models, the embodiments of the present disclosure can implement the preset real-valued network model and the preset complex-valued network model based on the TCN model. In addition, in order to further improve the effect of audio noise reduction, the embodiments of the present disclosure can utilize a two-stage temporal convolution network (TCN) model to perform noise reduction processing on the audio, thereby significantly improving the sound quality of audio.

FIG. 2 is a schematic diagram of a two-stage TCN model provided by an embodiment of the present disclosure. The two-stage TCN model includes a real-valued TCN model and a complex-valued TCN model, and Y(n) is used to represent the audio data to be denoised.

In practical application, after Y(n) is acquired, a short-time Fourier transform STFT and a Log|.| process are performed on Y(n) firstly, and the processed result is output to the real-valued TCN model, which outputs an amplitude time-frequency mask corresponding to Y(n) after processing; then an original amplitude spectrum of Y(n) is obtained, and a product of the original amplitude spectrum and the amplitude time-frequency mask is calculated as a first-order enhanced amplitude spectrum $\overline{S}_{mag}$ corresponding to Y(n). A complex frequency spectrum to be denoised that is obtained based on the first-order enhanced amplitude spectrum and the original phase spectrum $Y_{phase}$ is input into the complex TCN model, and a complex time-frequency mask corresponding to Y(n) is output after processing by the complex TCN model. The complex time-frequency mask corresponding to Y(n) includes a real part $\hat{M}_r$ and an imaginary part $\hat{M}_i$.

It should be noted that the embodiments of the present disclosure do not limit the model architecture and parameters configured to implement the real-valued TCN model and the complex-valued TCN model.

In practical applications, before a noise reduction of the audio by using the two-stage TCN model, the two-stage TCN model is trained firstly. Specifically, the two-stage TCN model can be trained by using audio training data whose sampling rate is higher than a preset sampling rate threshold, so that a trained, two-stage TCN model can perform better denoising processing on the audio data with a higher sampling rate. The preset sampling rate threshold may be a value greater than 16K.

In an implementation, the two-stage TCN model can be trained by using a time-domain loss function SISNR. The time-domain loss function SISNR will not be introduced here in details.

Additionally, in order to improve the robustness of the two-stage TCN model, a preset data augmentation processing can be performed on the audio training samples to enrich the diversity of the audio training samples, before training the two-stage TCN model.

In an implementation, the preset data augmentation processing includes a high-passing process, a low-passing process, a band-passing process, a setting of different volumes and/or an equalizing process performed on the audio training samples according to preset probabilities.

The preset data augmentation processing may include processing operations such as a high-passing process, a low-passing process, a band-passing process, a setting of different volumes and/or an equalizing process performed on the audio training samples with a given probability.

In practical applications, after performing the preset data augmentation processing on the audio training samples and obtaining augmented audio training samples, the augmented audio training samples can be configured to train the two-stage TCN model.

In an implementation, a sampling rate of the augmented audio training samples may be higher than a preset sampling rate threshold, so as to ensure the robustness of the nose reduction processing performed on the audio data with high sampling rate by using the two-stage TCN model.

The audio denoising method provided by the embodiments of the present disclosure can utilize the two-stage TCN model to achieve audio noise reduction, especially for the suppression of non-stable noise in the audio, which further improves the noise reduction effect and improves the audio quality, thereby improving the user's experience.

Figure 3:
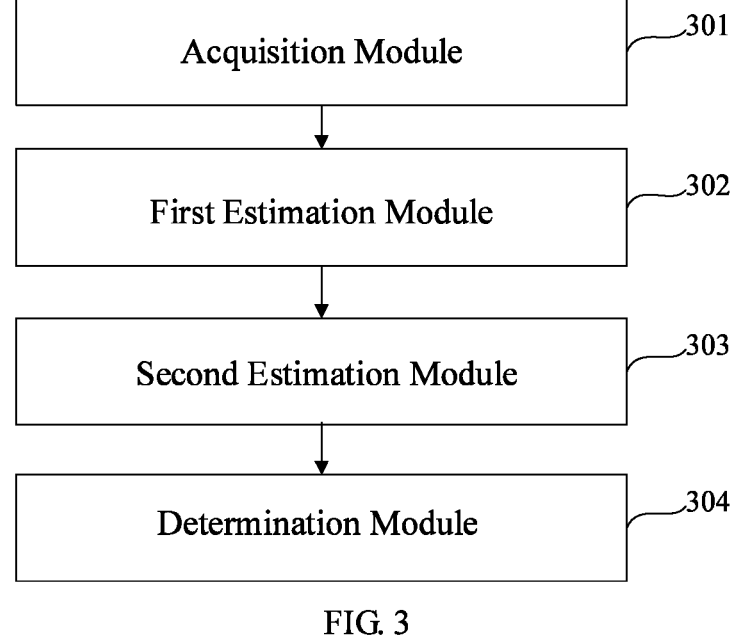
FIG. 3 is a schematically structural diagram of an audio denoising device provided by an embodiment of the present disclosure.

Based on the above method embodiments, the present disclosure also provides an audio denoising device. Referring to FIG. 3, it is a schematically structural diagram of an audio denoising device provided by an embodiment of the present disclosure. The device includes:

an acquisition module 301, configured to acquire audio data to be denoised;

a first estimation module 302, configured to estimate an amplitude time-frequency mask of the audio data to be denoised by using a preset real-valued network model; wherein the amplitude time-frequency mask is configured to determine a first-order enhanced amplitude spectrum corresponding to the audio data to be denoised;

a second estimation module 303, configured to estimate a complex time-frequency mask of the audio data to be denoised by using a preset complex-valued network model; and a determination module 304, configured to determine denoising-resulted audio data corresponding to the audio data to be denoised based on the first-order enhanced amplitude spectrum and the complex time-frequency mask corresponding to the audio data to be denoised.

In an implementation, the second estimation module includes:

a first determination submodule, configured to determine a complex frequency spectrum to be denoised; wherein the complex frequency spectrum to be denoised includes a complex frequency spectrum determined based on the first-order enhanced amplitude spectrum corresponding to the audio data to be denoised and an original phase spectrum of the audio data to be denoised, or a complex frequency spectrum determined based on an original frequency spectrum of the audio data to be denoised and the original phase spectrum of the audio data to be denoised; and a first processing submodule, configured to input the complex frequency spectrum to be denoised into the preset complex-valued network model, and output the complex time-frequency mask corresponding to the audio data to be denoised after a process of the preset complex-valued network model.

In an implementation, the determination module includes:

a second determination submodule, configured to determine an amplitude gain and a phase gain based on the complex time-frequency mask;

a third determination submodule, configured to determine an enhanced phase spectrum corresponding to the audio data to be denoised based on the phase gain and the original phase spectrum corresponding to the audio data to be denoised;

a fourth determination submodule, configured to determine a second-order enhanced amplitude spectrum corresponding to the audio data to be denoised based on the amplitude gain and the first-order enhanced amplitude spectrum corresponding to the audio data to be denoised; and a fifth determination submodule, configured to determine the denoising-resulted audio data corresponding to the audio data to be denoised based on the second-order enhanced amplitude spectrum and the enhanced phase spectrum.

In an implementation, the preset real-valued network model and the preset complex-valued network model are configured to form a two-stage time-domain convolutional network TCN model.

In an implementation, the device further includes:

a training module, configured to train the two-stage TCN model by using audio training samples having a sampling rate higher than a preset sampling rate threshold.

In an implementation, the device further includes:

an augmentation module, configured to perform a preset data augmentation processing on the audio training samples to obtain augmented audio training samples;

correspondingly, the training module is specifically configured to:

train the two-stage TCN model by using the augmented audio training samples;

wherein the augmented audio training samples have a sampling rate higher than the preset sampling rate threshold.

In an implementation, the preset data augmentation processing includes performing a high-passing process, a low-passing process, a band-passing process, a setting of different volumes and/or an equalizing process on the audio training samples according to preset probabilities.

In an implementation, the training module is specifically configured to train the two-stage TCN model by using a time-domain loss function SISNR.

In an implementation, the amplitude time-frequency mask is configured to determine the first-order enhanced amplitude spectrum corresponding to the audio data to be denoised, which includes the case that the amplitude time-frequency mask is multiplied with the original amplitude spectrum of the audio data to be denoised to obtain the first-order enhanced amplitude spectrum corresponding to the audio data to be denoised.

In the audio denoising device provided by the embodiments of the present disclosure, firstly, audio data to be denoised is acquired, and then an amplitude time-frequency mask of the audio data to be denoised is estimated by using a preset real-valued network model, and a first-order enhanced amplitude spectrum corresponding to the audio data to be denoised can be obtained. Furthermore, a complex time-frequency mask of the audio data to be denoised is estimated by using a preset complex-valued network model, and denoising-resulted audio data corresponding to the audio data to be denoised is determined by combining the first-order enhanced amplitude spectrum with the complex time-frequency mask. The embodiments of the present disclosure utilize the preset real-valued network model to enhance the amplitude spectrum of the audio data to be denoised, and utilize the preset complex-valued network model to enhance both amplitude spectrum and phase spectrum of the audio data to be denoised at the same time. As it can be seen, the embodiments of the present disclosure can realize the noise reduction processing of the audio data, thereby improving the sound quality of audio in a better way.

In addition to the above method and device, an embodiment of the present disclosure also provides a computer-readable storage medium having instructions stored therein, and when the instructions are executed on a terminal device, the terminal device can realize the audio denoising method described in the embodiments of the present disclosure.

An embodiment of the present disclosure also provides a computer program product including computer programs/instructions, and the computer programs/instructions can realize the audio denoising method described in the embodiment of the present disclosure when executed by a processor.

Figure 4:
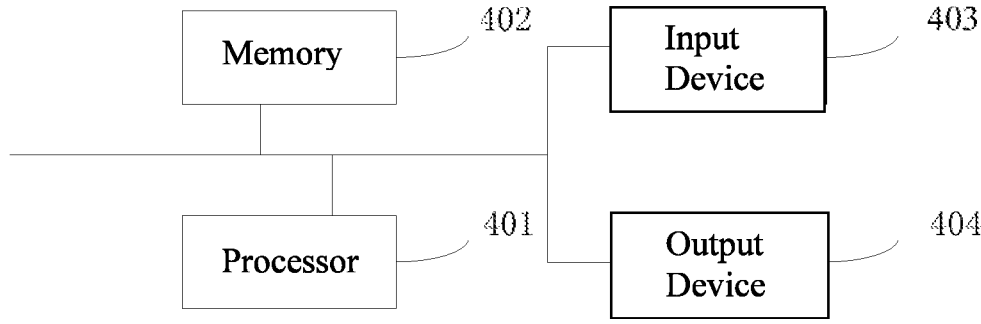
FIG. 4 is a schematically structural diagram of an audio denoising apparatus provided by an embodiment of the present disclosure.

In addition, an embodiment of the present disclosure also provides an audio denoising apparatus. Referring to FIG. 4, the audio denoising apparatus may include:

a processor 401, a memory 402, an input device 403, and an output device 404. The number of the processor 401 in the audio denoising apparatus may be one or more, and one processor is taken as an example in FIG. 4. In some embodiments of the present disclosure, the processor 401, the memory 402, the input device 403 and the output device 404 may be connected through a bus or other means, wherein the connection through the bus is taken as an example in FIG. 4.

The memory 402 can be configured to store software programs and modules, and the processor 401 executes various functional applications and data processing of the audio denoising apparatus by running the software programs and modules stored in the memory 402. The memory 402 may mainly include a program storage area and a data storage area, wherein the program storage area may store an operating system, at least one application program required for a function, and the like. In addition, the memory 402 may include a high-speed random-access memory, and may also include a non-volatile memory, such as at least one magnetic disk storage device, flash memory device, or other volatile solid-state storage devices. The input device 403 can be configured to receive input numbers or character information, and to generate signal input related to user settings and function control of the audio denoising apparatus.

Specifically, in the present embodiment, the processor 401 can follow the following instructions to load the executable files corresponding to the processes of one or more application programs into the memory 402, and the processor 401 can run the application programs stored in the memory 402 to realize the various functions of the above-described audio denoising apparatus.

It should be noted that in the present disclosure, relational terms such as "first" and "second" are only used to distinguish one entity or operation from another entity or operation, and do not necessarily require or imply that there is any such actual relationship or order between these entities or operations. Moreover, the terms "including", "containing" or any other variation thereof are intended to cover non-exclusive inclusion, so that a process, method, article or equipment including a series of elements includes not only those elements, but also other elements not explicitly listed or elements inherent to such process, method, article or equipment. Without further restrictions, an element defined by the phrase "including one . . . " does not exclude the existence of other identical elements in the process, method, article or equipment including the element.

What have been described above are only the specific embodiments of the present disclosure, so that those skilled in the art can understand or realize the present disclosure. Many modifications to these embodiments will be obvious to those skilled in the art, and the general principles defined herein can be implemented in other embodiments without departing from the spirit or scope of the present disclosure. Therefore, the present disclosure is not to be limited to the embodiments described herein, but is to be in accordance with the widest scope consistent with the principles and novel features disclosed herein.

What is claimed is:

1. An audio denoising method, comprising:

acquiring audio data to be denoised;

estimating an amplitude time-frequency mask of the audio data to be denoised by using a preset real-valued network model, wherein the amplitude time-frequency mask is configured to determine a first-order enhanced amplitude spectrum corresponding to the audio data to be denoised;

estimating a complex time-frequency mask of the audio data to be denoised by using a preset complex-valued network model; and determining denoising-resulted audio data corresponding to the audio data to be denoised based on the first-order enhanced amplitude spectrum and the complex time-frequency mask corresponding to the audio data to be denoised;

wherein the amplitude time-frequency mask is configured to determine the first-order enhanced amplitude spectrum corresponding to the audio data to be denoised, which comprises the case that:

the amplitude time-frequency mask is configured to be multiplied with an original amplitude spectrum of the audio data to be denoised to obtain the first-order enhanced amplitude spectrum corresponding to the audio data to be denoised.

2. The audio denoising method according to claim 1, wherein the estimating the complex time-frequency mask of the audio data to be denoised by using the preset complex-valued network model comprises:

determining a complex frequency spectrum to be denoised; wherein the complex frequency spectrum to be denoised comprises a complex frequency spectrum determined based on the first-order enhanced amplitude spectrum corresponding to the audio data to be denoised and an original phase spectrum of the audio data to be denoised, or, a complex frequency spectrum determined based on an original frequency spectrum of the audio data to be denoised and the original phase spectrum of the audio data to be denoised; and inputting the complex frequency spectrum to be denoised into the preset complex-valued network model, and outputting the complex time-frequency mask corresponding to the audio data to be denoised after a process of the preset complex-valued network model.

3. The audio denoising method according to claim 2, wherein the determining the denoising-resulted audio data corresponding to the audio data to be denoised based on the first-order enhanced amplitude spectrum and the complex time-frequency mask corresponding to the audio data to be denoised comprises:

determining an amplitude gain and a phase gain based on the complex time-frequency mask;

determining an enhanced phase spectrum corresponding to the audio data to be denoised based on the phase gain and an original phase spectrum corresponding to the audio data to be denoised;

determining a second-order enhanced amplitude spectrum corresponding to the audio data to be denoised based on the amplitude gain and the first-order enhanced amplitude spectrum corresponding to the audio data to be denoised; and determining the denoising-resulted audio data corresponding to the audio data to be denoised based on the second-order enhanced amplitude spectrum and the enhanced phase spectrum.

4. The audio denoising method according to claim 1, wherein the determining the denoising-resulted audio data corresponding to the audio data to be denoised based on the first-order enhanced amplitude spectrum and the complex time-frequency mask corresponding to the audio data to be denoised comprises:

determining an amplitude gain and a phase gain based on the complex time-frequency mask;

determining an enhanced phase spectrum corresponding to the audio data to be denoised based on the phase gain and an original phase spectrum corresponding to the audio data to be denoised;

determining a second-order enhanced amplitude spectrum corresponding to the audio data to be denoised based on the amplitude gain and the first-order enhanced amplitude spectrum corresponding to the audio data to be denoised; and determining the denoising-resulted audio data corresponding to the audio data to be denoised based on the second-order enhanced amplitude spectrum and the enhanced phase spectrum.

5. The audio denoising method according to claim 1, wherein the preset real-valued network model and the preset complex-valued network model are configured to form a two-stage time-domain convolutional network (TCN) model.

6. The audio denoising method according to claim 5, wherein before the estimating the amplitude time-frequency mask of the audio data to be denoised by using the preset real-valued network model, further comprising:

training the two-stage TCN model by using an audio training sample having a sampling rate higher than a preset sampling rate threshold.

7. The audio denoising method according to claim 6, wherein before the training the two-stage TCN model by using the audio training sample having a sampling rate higher than the preset sampling rate threshold, further comprising:

performing a preset data augmentation processing on the audio training sample to obtain an augmented audio training sample; and correspondingly, the training the two-stage TCN model by using the audio training sample having a sampling rate higher than the preset sampling rate threshold comprises:

training the two-stage TCN model by using the augmented audio training sample, wherein a sampling rate of the augmented audio training sample is higher than the preset sampling rate threshold.

8. The audio denoising method according to claim 7, wherein the preset data augmentation processing comprises a high-passing process, a low-passing process, a band-passing process, a setting of different volumes and/or an equalizing process performed on the audio training sample according to a preset probability.

9. The audio denoising method according to claim 6, wherein the training the two-stage TCN model comprises:

training the two-stage TCN model by using a time-domain loss function scale-invariant signal-to-noise ratio (SISNR).

10. An audio denoising device, comprising:

an acquisition module, configured to acquire audio data to be denoised;

a first estimation module, configured to estimate an amplitude time-frequency mask of the audio data to be denoised by using a preset real-valued network model; wherein the amplitude time-frequency mask is configured to determine a first-order enhanced amplitude spectrum corresponding to the audio data to be denoised;

a second estimation module, configured to estimate a complex time-frequency mask of the audio data to be denoised by using a preset complex-valued network model;

a determination module, configured to determine denoising-resulted audio data corresponding to the audio data to be denoised based on the first-order enhanced amplitude spectrum and the complex time-frequency mask corresponding to the audio data to be denoised;

wherein the amplitude time-frequency mask is configured to determine the first-order enhanced amplitude spectrum corresponding to the audio data to be denoised, which comprises the case that:

the amplitude time-frequency mask is configured to be multiplied with an original amplitude spectrum of the audio data to be denoised to obtain the first-order enhanced amplitude spectrum corresponding to the audio data to be denoised.

11. The audio denoising device according to claim 10, wherein the second estimation module comprises:

a first determination submodule, configured to determine a complex frequency spectrum to be denoised; wherein the complex frequency spectrum to be denoised comprises a complex frequency spectrum determined based on the first-order enhanced amplitude spectrum corresponding to the audio data to be denoised and an original phase spectrum of the audio data to be denoised, or a complex frequency spectrum determined based on an original frequency spectrum of the audio data to be denoised and the original phase spectrum of the audio data to be denoised; and a first processing submodule, configured to input the complex frequency spectrum to be denoised into the preset complex-valued network model, and output the complex time-frequency mask corresponding to the audio data to be denoised after a process of the preset complex-valued network model.

12. The audio denoising device according to claim 11, wherein the determination module comprises:

a second determination submodule, configured to determine an amplitude gain and a phase gain based on the complex time-frequency mask;

a third determination submodule, configured to determine an enhanced phase spectrum corresponding to the audio data to be denoised based on the phase gain and the original phase spectrum corresponding to the audio data to be denoised;

a fourth determination submodule, configured to determine a second-order enhanced amplitude spectrum corresponding to the audio data to be denoised based on the amplitude gain and the first-order enhanced amplitude spectrum corresponding to the audio data to be denoised; and a fifth determination submodule, configured to determine the denoising-resulted audio data corresponding to the audio data to be denoised based on the second-order enhanced amplitude spectrum and the enhanced phase spectrum.

13. The audio denoising device according to claim 10, wherein the determination module comprises:

a second determination submodule, configured to determine an amplitude gain and a phase gain based on the complex time-frequency mask;

a third determination submodule, configured to determine an enhanced phase spectrum corresponding to the audio data to be denoised based on the phase gain and an original phase spectrum corresponding to the audio data to be denoised;

a fourth determination submodule, configured to determine a second-order enhanced amplitude spectrum corresponding to the audio data to be denoised based on the amplitude gain and the first-order enhanced amplitude spectrum corresponding to the audio data to be denoised; and a fifth determination submodule, configured to determine the denoising-resulted audio data corresponding to the audio data to be denoised based on the second-order enhanced amplitude spectrum and the enhanced phase spectrum.

14. The audio denoising device according to claim 10, wherein the preset real-valued network model and the preset complex-valued network model are configured to form a two-stage time-domain convolutional network (TCN) model.

15. The audio denoising device according to claim 14, further comprising: a training module, configured to train the two-stage TCN model by using an audio training sample having a sampling rate higher than a preset sampling rate threshold.

16. The audio denoising device according to claim 15, further comprising:

an augmentation module, configured to perform a preset data augmentation processing on the audio training sample to obtain an augmented audio training sample; and the training module is configured to train the two-stage TCN model by using the augmented audio training sample; wherein the augmented audio training sample has a sampling rate higher than the preset sampling rate threshold.

17. The audio denoising device according to claim 16, wherein the preset data augmentation processing comprises a high-passing process, a low-passing process, a band-passing process, a setting of different volumes and/or an equalizing process performed on the audio training sample according to a preset probability.

18. The audio denoising device according to claim 16, wherein the training module is configured to train the two-stage TCN model by using a time-domain loss function scale-invariant signal-to-noise ratio (SISNR).

\* \* \* \* \*